INVENTOR.
WILLARD E. ANDERSON

United States Patent Office 3,426,211
Patented Feb. 4, 1969

3,426,211
REFRACTOMETERS
Willard E. Anderson, Lauderdale, Minn., assignor to Honeywell Inc., Minneapolis, Minn., a corporation of Delaware
Filed Oct. 21, 1965, Ser. No. 499,484
U.S. Cl. 250—218
Int. Cl. G01n *21/16, 21/00;* G01j *3/00*
2 Claims

ABSTRACT OF THE DISCLOSURE

A refractometer in which light is directed through a refracting sample by a prism and the density of the sample is measured by a coded detector which senses the position of incidence of the refracted light beam.

---

This invention relates to apparatus to optically measure the density of a fluid. Although the invention is described herein as using a light beam and its refractive properties to measure the density of water, it should be understood that the invention encompasses the measurement of any fluid medium and the use of any form of radiation so long as the fluid medium in question will transmit the radiation therethrough.

My invention has its greatest utility in the measurement of a fluid which is continually changing density. An example of this is in a submarine where it is essential to have a constant knowledge of the density of the water at an instantaneous rate. Various techniques involving weighing a sample of the water are inherently too slow for such an application. Briefly, the present invention provides instantaneous readout of the density of the water by measuring the refractive index of the water with a beam of light. The light travels through a prism and emerges at the surface of the prism into the fluid to be measured where it is refracted through an angle dependent upon the density of the fluid. The light beam then re-enters the prism and is internally reflected to a coded reticle so that the position of incidence of the beam and therefore the refractive angle may be measured. This apparatus lends itself to rugged and compact construction which can withstand the stresses and strains imposed on it by use in a vehicle such as a submarine.

Figure 1:
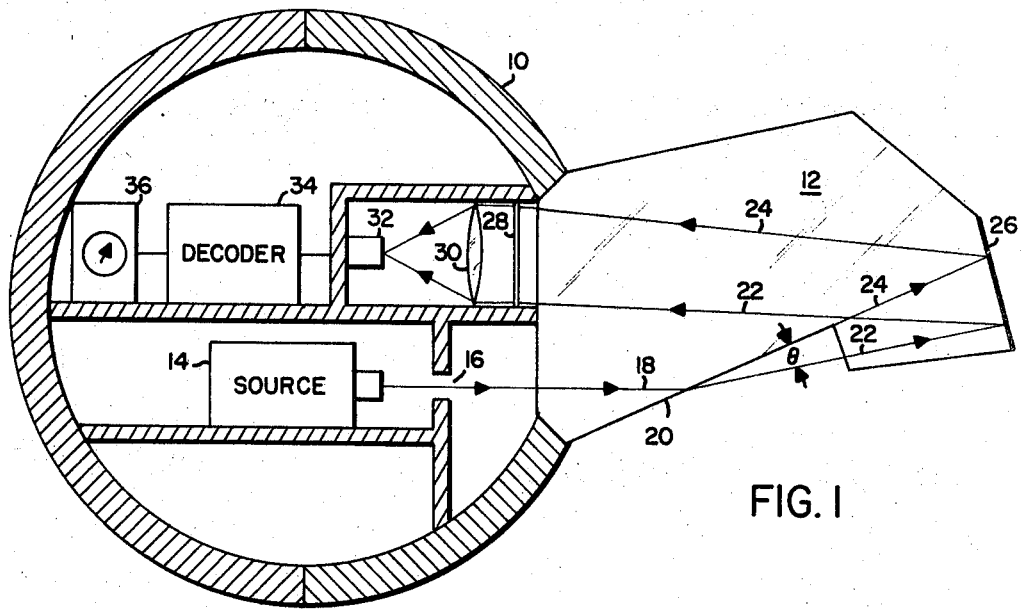
Figure 2:
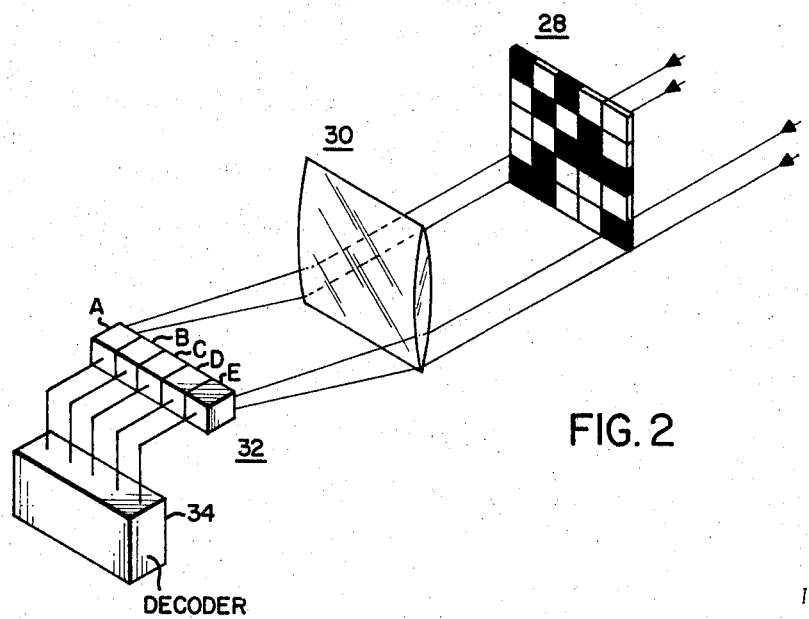

Accordingly, it is an object of the present invention to provide density measuring apparatus which combines the features of ruggedness and simplicity with a fast and accurate indication of the density of the medium in question. Further objects and advantages will become apparent from the following descriptions and drawings in which:

FIGURE 1 is a sectional schematic view of a preferred embodiment of the present invention; and
FIGURE 2 is a more detailed schematic drawing showing a portion of the apparatus of FIGURE 1.

In FIGURE 1 a substantially water tight housing 10 is shown with a glass, or other suitable quartz, prism 12 forming a portion of the wall thereof. Housing 10 and prism 12 are designed in the preferred embodiment to be immersed in the fluid whose density is to be measured. If desired only the prism 12 need be in contact with the fluid. A source of light 14 and a slit 16 combine to produce a flat rectangular beam of light 18 which is directed toward a surface 20 on prism 12. Any apparatus which is operable to produce a beam of light could be employed in this embodiment, the configuration shown being only one of many possible approaches. The reason for utilizing a flat rectangular beam of light will be explained later with reference to FIGURE 2.

As the light beam strikes surface 20 of prism 12 it is refracted through an angle which is dependent upon the relative index of refraction of the prism 12 and of the fluid surrounding prism 12. Since the index of refraction of the fluid is substantially proportional to the density of the fluid the angle of refraction is indicative of the density of the fluid surrounding prism 12. The light may be refracted through a variety of angles the extremes of which are indicated by a pair of rays 22 and 24 in FIGURE 1. An end surface 26 on prism 12 is made reflective so as to reflect all of the rays between 22 and 24 back toward a coded reticle or grid array 28. It should be understood that many means may be employed to return the light beam to reticle 28 such as additional prisms or the like. The refraction that takes place as the beam re-enters the prism may be neglected in the preferred embodiment although, if desired, it could be corrected for in the readout. The light then passes through a cylindrical lens 30 which focuses the light onto a group of detectors 32. Grid array 28, lens 30, and detectors 32 operate to determine the position at which the light beam 18 returns to the housing 10 so that the refraction angle $\theta$, and consequently the density of the surrounding fluid, may be determined. The operation of grid array 28, lens 30, and detectors 32 may be better understood with reference to FIGURE 2.

As can be seen in FIGURE 2 grid array 28 is composed of a grid of transparent and opaque areas which are shown in this preferred embodiment as squares. Each horizontal row has a definite code arrangement so that a flat beam of light passing therethrough may be identified by a decoder 34. For example, in FIGURE 2 a flat rectangular beam of light is shown impinging on the bottom row as is beam 22 in FIGURE 1. Since the bottom horizontal row of array 28 has only two squares which are transparent only two of the detectors of detector array 32 are activated. The flat rectangular beam of light is focused on detector array 32 and because of the particular code for this position of the light beam detectors $c$ and $d$ of detector array 32 are activated. Detectors $a, b, c, d$, and $e$ are of a variety which will generate an output signal when light impinges upon them. Thus, two of the five detectors supply an output signal to decoder 34 which is operable to recognize this type of input as representing the bottom row or minimum refraction angle. Referring again to FIGURE 1, decoder 34 then transmits a signal to an indicator 36 indicative of the bottom row and indicator 36 displays this information. Indicator 36, of course, may be removed to any suitable position such as within the submarine.

One possible code arrangement that may be utilized is to arrange the successive horizontal rows in grid array 28 in a binary code such as a Gray code. In a Gray code only one square would vary from one row to the next. Decoder 34 can then be a binary decoder and indicator 36 may simply be a counter type of mechanism. Numerous other code systems may be employed without limiting the accuracy desired since transparency array 28 may be expanded in width and depth to any number of squares desired.

Many other modifications may be made to the apparatus shown without departing from the spirit and scope of the invention. For instance, although the light in FIGURE 1 may be of a conventional nature such as a mercury lamp, if greater accuracy is desired and a more precisely defined light beam is required a laser may be used to generate the flat beam of light. In addition prism 12 can vary greatly in shape from that disclosed without materially affecting its mode of operation. This variation may well include the curving of surface 26 so as to better focus the light beams onto transparency array 28. Consequently, I do not intend to limit the invention to the particular configuration or apparatus disclosed except as defined by the appended claims.

I claim:
1. Apparatus to measure fluid density comprising in combination:
   means generating and defining a flat collimated beam of light;
   means for receiving said beam of light, said receiving means operable to determine the position of incidence of said beam and comprising an array of transparent and opaque areas arranged in parallel rows, each row operable to receive said flat beam of light, and each row having some of its areas opaque according to a predetermined code;
   a plurality of detectors, each operable to monitor all the transparencies forming a single column in said array;
   decoder means connected to said detectors to determine which row said light is impinging upon as indicated by which combination of detectors is activated; and
   a prism immersed in the fluid and positioned so as to transmit said beam of light to said receiving means, said prism having a wedge shaped indentation therein suitable to admit fluid to a position where the fluid will intercept and refract said beam of light through an angle the magnitude of which is dependent upon the density of the fluid.
2. A fluid density determining device using optical techniques comprising:
   a substantially sealed housing for immersion in the fluid to be measured;
   means enclosed within said housing for producing a light beam;
   an internally reflecting prism having a re-entrant angle therein, said prism forming a portion of the wall of said sealed housing and being positioned so that said light beam traverses said re-entrant angle and the fluid within and experiences refraction therefrom in an amount dependent upon the density of the fluid;
   detecting means in said housing operable to measure the returning position of said light beam as an indication of the degree of refraction and therefrom the density of the fluid comprising:
   an array of transparent and opaque areas arranged in parallel rows, each row operable to receive said beam of light, and each row having some of its areas opaque according to a predetermined code;
   a plurality of detectors, each operable to monitor all of the transparencies forming a column in said array; and
   decoder means connected to said detectors to determine which row said light beam is impinging on as indicated by which combination of detectors is activated.

References Cited

UNITED STATES PATENTS

| 1,471,342 | 10/1923 | Logan | 23—253 |
| 2,427,996 | 9/1947 | Segman | 250—218 |
| 2,972,926 | 2/1961 | Goldberg et al. | 88—14 |

FOREIGN PATENTS 758,908  8/1954  Germany.

JAMES W. LAWRENCE, *Primary Examiner.*

R. F. HOSSFELD, *Assistant Examiner.*

U.S. Cl. X.R.

88—14